United States Patent
Hinckley et al.

(10) Patent No.: US 7,071,919 B2
(45) Date of Patent: Jul. 4, 2006

(54) POSITIONAL SCROLLING

(75) Inventors: Kenneth P. Hinckley, Seattle, WA (US); Steven N. Bathiche, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 859 days.

(21) Appl. No.: 09/791,899

(22) Filed: Feb. 26, 2001

(65) Prior Publication Data

US 2002/0118168 A1  Aug. 29, 2002

(51) Int. Cl.
*G09G 5/08* (2006.01)

(52) U.S. Cl. ........................... 345/163; 345/684

(58) Field of Classification Search ............... 341/20; 345/2.2, 688, 157–164, 785, 786, 684
See application file for complete search history.

(56) References Cited

U.S. PATENT DOCUMENTS

| | | | |
|---|---|---|---|
| 5,495,566 A | 2/1996 | Kwatinetz | |
| 5,530,455 A * | 6/1996 | Gillick et al. | 345/163 |
| 5,633,657 A | 5/1997 | Falcon | |
| 5,659,333 A * | 8/1997 | Okishima | 345/688 |
| 5,726,669 A * | 3/1998 | Obata et al. | 345/2.2 |
| 5,726,687 A * | 3/1998 | Belfiore et al. | 345/785 |
| 5,877,748 A | 3/1999 | Redlich | |
| 5,943,052 A | 8/1999 | Allen et al. | |
| 6,075,533 A | 6/2000 | Chang | |
| 6,097,371 A * | 8/2000 | Siddiqui et al. | 345/164 |
| 6,128,006 A | 10/2000 | Rosenberg et al. | |
| 6,198,473 B1 | 3/2001 | Armstrong | |
| 6,259,382 B1 * | 7/2001 | Rosenberg | 341/20 |
| 6,259,432 B1 | 7/2001 | Yamada et al. | |
| 6,310,607 B1 | 10/2001 | Amemiya | |
| 6,351,273 B1 * | 2/2002 | Lemelson et al. | 345/786 |
| 6,421,064 B1 * | 7/2002 | Lemelson et al. | 345/688 |

FOREIGN PATENT DOCUMENTS

TW  NI87460  6/1997

OTHER PUBLICATIONS

Andrew Sears and Ben Shneiderman, High precision touchscreens: design strategies and comparisons with a mouse, study, Int. J. Man-Machine Studies, 1991, 34, pp. 593-613, Dept. of Computer Science and Human-Computer Interaction Laboratory, University of Maryland, College Park, MD 20742.

(Continued)

*Primary Examiner*—Sumati Lefkowitz
*Assistant Examiner*—Srilakshmi K Kumar
(74) *Attorney, Agent, or Firm*—Banner & Witcoff, Ltd.

(57) ABSTRACT

A method and system for electronically scrolling a document with a data processing apparatus uses an input device, e.g., a mouse, to permit position based scrolling without first accessing a scroll bar or other scrolling functionality element. In a page positional scrolling (PPS) mode useful for scrolling short distances, a displayed document is scrolled one pixel per one pixel of motion of the mouse. In a second mode (document positional scrolling—DPS), the document is scrolled a distance per pixel of mouse movement corresponding to the ratio of the document length (or width) to the page length (or width). In a further embodiment (smoothed document positional scrolling—SDPS), as the mouse is moved away from a starting position the system begins scrolling in PPS, transitions smoothly from PPS to DPS, and then continues to scroll in DPS.

56 Claims, 4 Drawing Sheets

OTHER PUBLICATIONS

Shumin Zhai and Paul Milgram, Human Performance Evaluation of Manipulation Schemes in Virtual Environments, paper, Proc. IEEE Virtual Reality Annual International Symposium (VRAIS), Seattle, WA, Sep. 1993, Dept. of Industrial Engineering, Univ. of Toronto, Toronto, Canada M5S 1A4.

Andrew Sears, Catherine Plaisant, Ben Shneiderman, A New Era for High Precision Touchscreens, paper, Human-Computer Interaction Labarotory & Department of Computer Science, University of Maryland, Jun. 1990, pp. 1-33.

Ken Hinckley, John C. Goble, Randy Pausch, Neal F. Kassell, New Applications for the Touchscreen in 2D and 3D Medical Imaging Workstations, paper, Proc. SPIE Medical Imaging '95, University of Virginia, Charlottesville, VA 22903, 10 pp.

Shumin Zhai, Barton A. Smith, Ted Selker, Improving Browsing Performance: A study of four input devices for scrolling and pointing tasks, paper, Proceedings of INTERACT97: The Sixth IFIP Conference on Human-Computer Interaction, Sydney, Australia, Jul. 14-18, pp. 286-292.

Shumin Zhai, Ph.D., Human Performance in Six Degree of Freedom Input Control, thesis, Ergonomics in Teleoperation and Control Lab, Dept. of Industrial Engineering, University of Toronto, 1995, 227 pp.

George G. Robertson, Stuart K. Card, and Jock D. MacKinlay, The Cognitive Coprocessor Architecture for Interactive User Interfaces, paper, Xerox Palo Alto Research Center, 333 Coyote Hill Road, Palo Alto, CA 94304, 1989, pp. 10-18.

I. Scott MacKenzie, Input Devices and Interaction Techniques for Advanced Computing, paper, In W. Barfield, & T.A. Furness III (Eds.), Virtual environments and advanced interface design, 1995, pp. 437-470, Oxford, UK: Oxford University Press.

Herbert D. Jellinek, Stuart K. Card, Powermice and User Performance, paper, Xerox Palo Alto Research Center, 3333 Coyote Hill Road, Palo Alto, CA 94304, CHI '90 Proceedings, Apr. 1990, pp. 213-220.

Shumin Zhai, "Human Performance in Six Degree of Freedom Input Control", 1995, 225 pages.

* cited by examiner

POSITIONAL SCROLLING

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The present invention relates generally to user-actuated navigation of a document using a data processing apparatus. More particularly, the invention relates to enhancing electronic scrolling of a document through use of a cursor control device.

The computer mouse has simplified the computer-human interface. Before the computer mouse, many users were confined to interacting with a computer through the use of a command line interface (CLI as is known in the art). The computer mouse (also commonly referred to simply as a "mouse") has, in recent years, been improved upon with the inclusion of a wheel on the top of the mouse. An example of a wheeled mouse is shown in FIG. 1. The function of the wheel 106 is to scroll the text or document or image located below a displayed cursor 113 shown on a visual display device 112. The wheel is linked to an optically encoded wheel for sensing the rotational location of the wheel 106. To allow for feedback to the user, the wheel contains a number of notches (not shown for simplicity). When rotated, a user is presented with tactile feedback of the distance rotated through sensing the number of notches rotated by the wheel. The function of wheel 106 is interpreted through signals sent from mouse 101 through a cable 110 to a computer 109 having a memory 114 and a processor 115. Shown for completeness is a keyboard 116, which is generally used in combination with mouse 101 for various operations as are known in the art. For example, rotating the wheel away from the user may scroll the underlying displayed content down so as to show another portion of the displayed content immediately preceding the originally displayed content. Likewise, rotating the wheel toward the user may scroll the underlying displayed content up.

Other features of a wheeled mouse and alternative techniques of navigating a display through the use of the wheeled mouse are disclosed in U.S. Ser. No. 09/212,898, filed Dec. 16, 1998, for "System and Method of Adjusting Display Characteristics of a Displayable Data File Using An Ergonomic Computer Input Device." The contents of this application are hereby incorporated by reference herein.

When a user desires to move long distances through a document displayed on a computer, various methods can be used. Using a typical computer keyboard, the user can use cursor arrows or page up and page down keys. Referring to FIG. 2, a GUI of a known word processing application shown an exemplary display window 200. Associated with window 200 are a vertical scroll bar 202 and a horizontal scroll bar 204. On each scroll bar 202, 204 there is a thumb 206, 208, an associated trough 210, 212, and a pair of navigation arrows (214a, 214b), (216a, 216b). Using a mouse or other conventional input device, e.g., trackball or touch pad, a user can interact in various ways with the scroll bars 202, 204. However, the use of scroll bars can be time consuming and distracting. The user must divert his/her attention away from the open document while an element of the scroll bar is acquired. As the user scrolls, the user must continuously divide his/her attention between the document and the scroll bar itself. In addition, some users may consider conventional scroll bars to be overly complicated, by virtue of the three different scrolling functionality elements utilized. The thumb 206, 208 of the scroll bar may be dragged in order to move quickly from one end of the document to the other. The navigation arrows (214a, 214b), (216a, 216b) may be clicked in order to move one line at a time. The trough 210, 212 of the scroll bar may be clicked in order to scroll up or down one screen at a time.

Scrolling through a computer document using wheel 106 on wheeled computer mouse 101 is helpful in that it provides useful document handling without the need to access the keyboard or displayed scroll bars. In a known wheel scrolling system, for every notch indent of rotation of the wheel, the screen display may scroll only one line. While this is effective for scrolling short distances, it is tedious and time consuming for scrolling longer distances.

A known "rate based" (position-rate mapping) scrolling system uses a mouse wheel or other button for scrolling through a displayed computer document. When the user clicks the wheel button and then drags the mouse, scrolling is carried out at a speed (rate) proportional to the displacement of the mouse from the point where the dragging motion was initiated. The scrolling continues until the user clicks the mouse wheel a second time. Alternatively, rate-based scrolling occurs while the wheel is clicked and held, until released. Many users find that precision scrolling is difficult with this "rate based" scrolling control. Studies have shown rate based scrolling as implemented with a mouse to be non-intuitive and slower as compared with other known cursor control schemes.

Some computer applications, such as Adobe Acrobat Reader®, employ a technique that allow the user to "grab" a document with the mouse and move the document in relation to the movement of the mouse. This technique has a number of drawbacks. The grabbing technique moves the document in the same direction as the mouse is moved, which is inconsistent with the use of the scroll bar and thus potentially confusing to users. Also, while the grabbing is being performed, the mouse cursor is visible and limited in movement by the edges of the display window. Grabbing may be an optional mode of an application. Thus, the user may be required to click on a menu button to activate the grabbing mode, which takes the user's attention away from the open document. Likewise, if the user has activated another mode, such as zooming, then grabbing is no longer available unless the user again activates a menu button to switch modes. Additionally, the grabbing functionality is implemented by specific applications and is not performed system wide. Also the grabbing mode offered in applications, such as Adobe, allows the user only to scroll within a displayed page; the mode is thus cumbersome and inappropriate for scrolling through multiple pages.

A less time consuming, less distracting and less complicated system for electronic scrolling of documents would represent a significant advancement in the art, as would a more accurate system for scrolling that is easier to control and which combines multiple functional modes for scrolling both long and short distances.

SUMMARY OF THE INVENTION

The present invention provides, in a first aspect, a scrolling control system for use with a data processing device having a display. An input device provides, in response to user actuations of the device, control of a cursor position on the display. At least one user actuated switch is provided. Control means are responsive to a user actuation of the switch to enter a view scrolling mode wherein scrolling of a document is controlled such that a scroll amount is based upon a position value determined by a user actuation of the input device, independent of a position of the cursor in relation to any scroll functionality elements appearing on said display.

In a second aspect, the invention is embodied in a method for controlling scrolling of a document in a data processing system having a display, a user actuated switch and an input device that provides positional control of a cursor on said display in response to a user actuation of the input device. In the method, a view scrolling mode is entered in response to a user actuation of the switch. View scrolling is controlled such that a scroll amount is based on a position value determined by the user actuation of the input device. The scrolling control is independent of a position of the cursor in relation to any scroll functionality elements appearing on the display.

In a third aspect, the invention is embodied in a scrolling control system for use with a data processing device having a display. An input device provides, in response to user actuations of the device, control of a cursor position on the display. At least one user actuated switch is provided. Control means are responsive to a user actuation of the switch to enter a scrolling mode wherein scrolling of a document is controlled such that a scroll amount is based upon a position value determined by a user actuation of the input device. The scrolling mode comprises a page positional scrolling mode wherein a one-to-one relationship exists between a displacement represented by the position value and a scroll amount. The scrolling mode further comprises a document positional scrolling mode wherein a unit amount of displacement represented by the position value results in a scroll amount corresponding to one of a ratio of document length to page length and a ratio of document width to page width. The scrolling mode still further comprises a transitional scrolling mode providing a scroll amount that varies between the scroll amount obtained in the PPS mode and the scroll amount obtained in the DPS mode.

In a fourth aspect, the invention is embodied in a method for controlling scrolling of a document in a data processing system having a display, a user actuated switch and an input device that provides positional control of a cursor on said display in response to a user actuation of the input device. In the method, a scrolling mode is entered in response to a user actuation of the switch. Scrolling is controlled such that a scroll amount is based on a position value determined by the user actuation of the input device. The scrolling mode comprises a page positional scrolling mode wherein a one-to-one relationship exists between a displacement represented by the position value and a scroll amount. The scrolling mode further comprises a document positional scrolling mode wherein a unit amount of displacement represented by the position value results in a scroll amount corresponding to one of a ratio of document length to page length and a ratio of document width to page width. The scrolling mode still further comprises a transitional scrolling mode providing a scroll amount that varies between the scroll amount obtained in the PPS mode and the scroll amount obtained in the DPS mode.

In a fifth aspect, the invention is embodied in a scrolling control system for use with a data processing device having a display. An input device provides, in response to user actuations of the device, control of a cursor position on the display. At least one user actuated switch is provided. Control means are responsive to a user actuation of the switch to enter a scrolling mode wherein scrolling of a document is controlled such that a scroll amount is based upon a position value determined by a user actuation of the input device, independent of a position of the cursor in relation to any scroll functionality elements appearing on said display. The scrolling mode is a document positional scrolling mode wherein a unit amount of displacement represented by the position value results in a scroll amount corresponding to either to a ratio of document length the page length or a ration of document width to page width.

In a sixth aspect, the invention is embodied in a method for controlling scrolling of a document in a data processing system having a display, a user actuated switch and an input device that provides positional control of a cursor on said display in response to a user actuation of the input device. In the method, a scrolling mode is entered in response to a user actuation of the switch. Scrolling is controlled such that a scroll amount is based on a position value determined by the user actuation of the input device. The scrolling control is independent of a position of the cursor in relation to any scroll functionality elements appearing on the display. The scrolling mode is a document positional scrolling mode wherein a unit amount of displacement represented by the position value results in a scroll amount corresponding to either to a ratio of document length the page length or a ration of document width to page width.

The above and other aspects, features and advantages of the present invention will be readily apparent and fully understood from the following detailed description of preferred embodiments, taken in conjunction with the appended drawings.

DETAILED DESCRIPTION OF PREFERRED EMBODIMENTS

The present invention employs a positional scrolling technique that permits electronic scrolling through a document with a data processing apparatus. Scrolling may be carried out through movement of a user input device (e.g., a mouse) and independent of a conventional scroll bar or other scrolling functionality display element. The term "document" is used broadly herein to refer to data files of all types including, but not limited to, pages from the Internet, images, spreadsheets, calendars. Also, scrolling through non-viewable media is considered part of the invention, including scrolling through audio and video files. For example, computer audio players often include a horizontal scroll bar that may be used to quickly scroll or jump to a user selectable position in the audio file. The invention may be applied in lieu of or in addition to a scroll bar to permit scrolling. Computer video players often include a similar feature for quickly moving through a video presentation, and the invention is equally applicable thereto. It will further be appreciated that the invention can be employed with various types of graphical user interfaces (GUI's), e.g., with or without windows, and with or without scroll bars or other scrolling functionality elements.

Figure 1A:
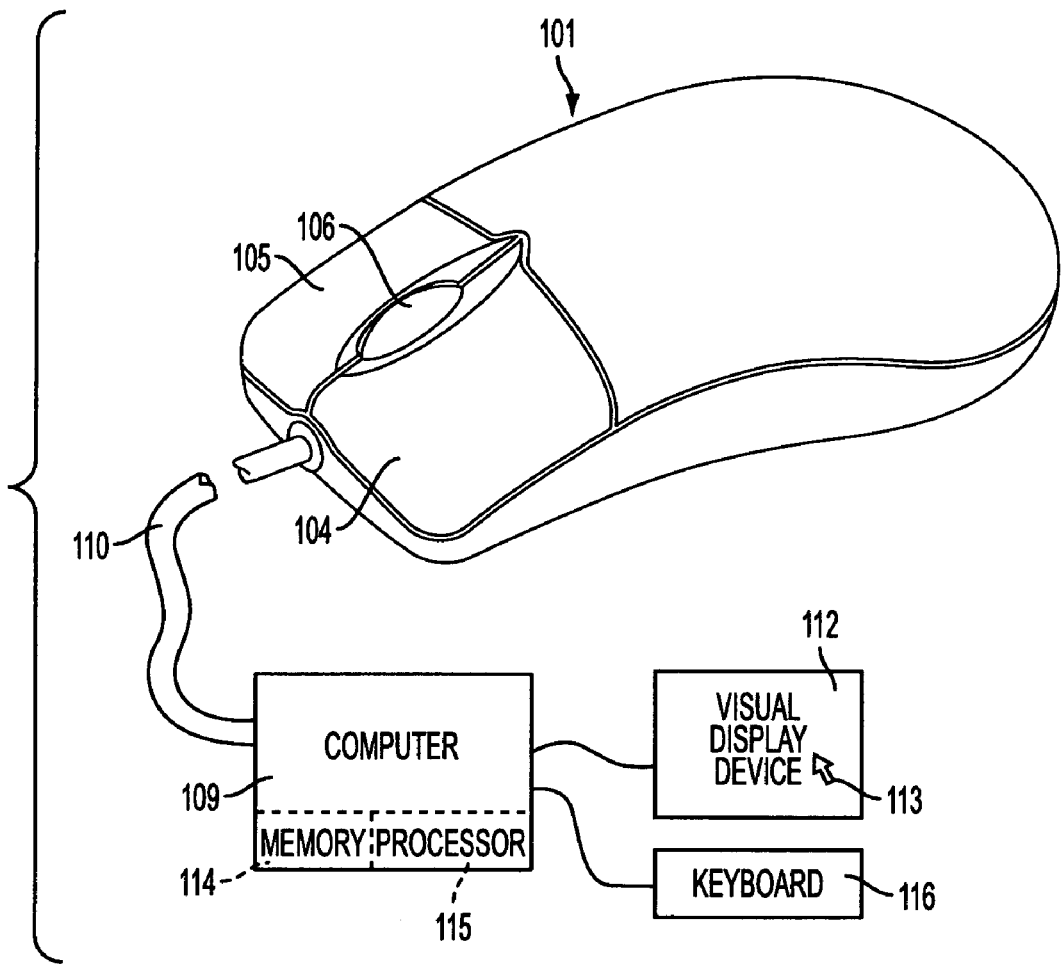
FIG. 1A is a perspective view of a mouse having a wheel, together with a diagrammatic representation of associated computer system components.
Figure 1B:
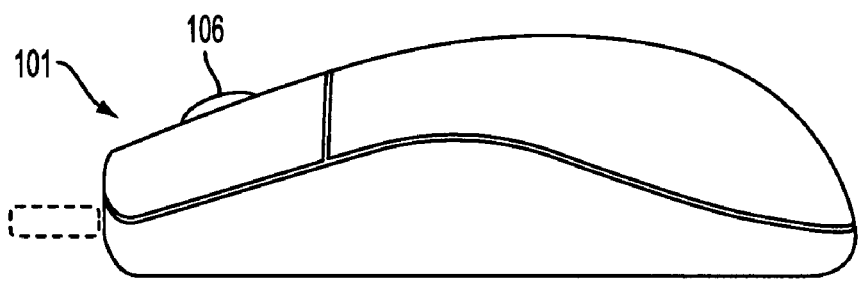
FIG. 1B is a side elevational view of the mouse shown in FIG. 1A.
Figure 2:
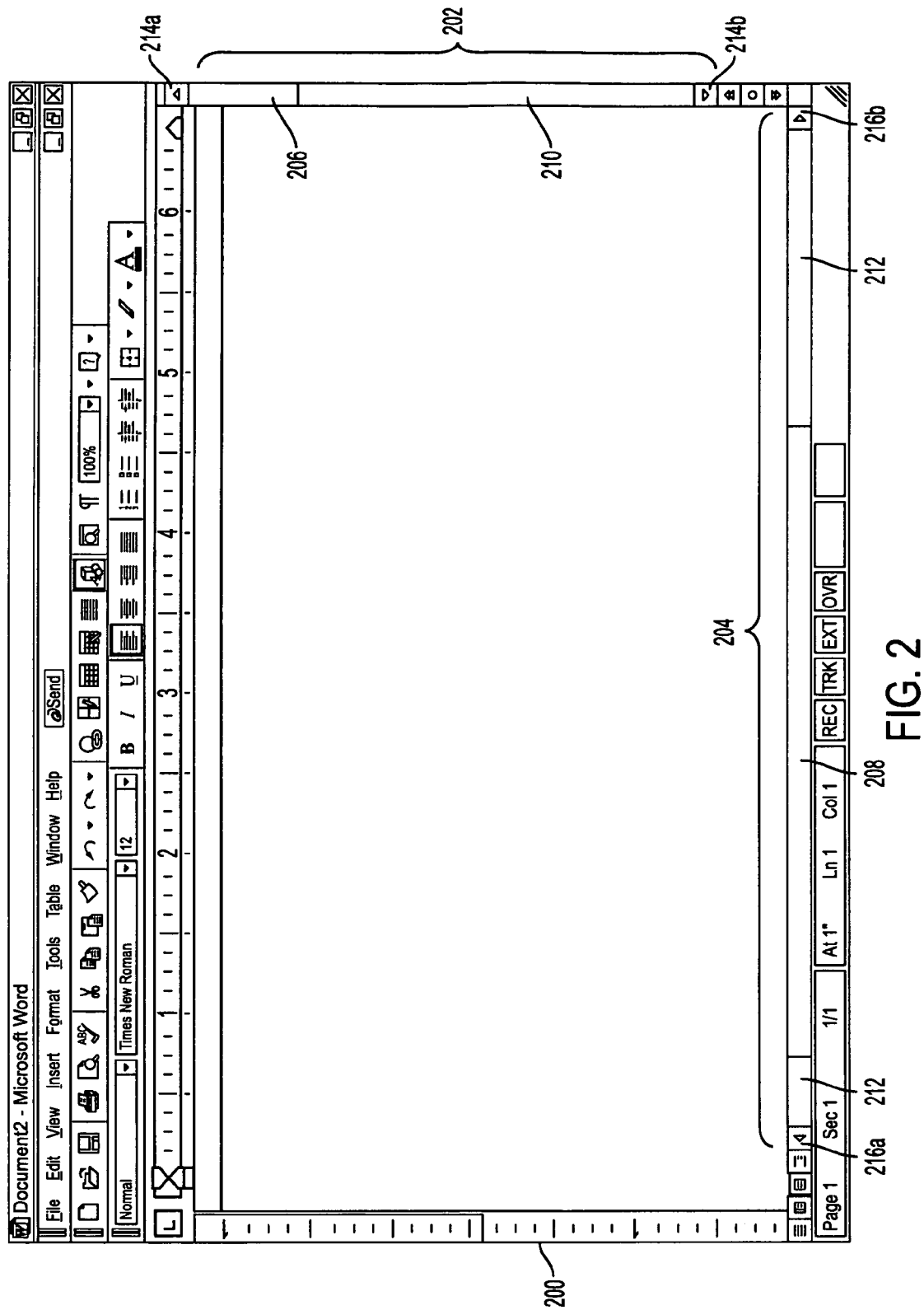
FIG. 2 is a screen print illustrating a display window with scroll bars included as part of an exemplary graphical user interface (GUI).

The invention is particularly useful for improving the scrolling performance of isotonic input devices utilized for providing positional control of a displayed cursor. Isotonic input devices are devices that are position sensing and not self-centering, such as a conventional computer mouse, trackball, touch pad or electronic pen. However, the invention may also be used with isometric input devices, such as the force (strain) sensitive TrackPoints commonly found in laptop keyboards, and self-centering joysticks. In an exemplary embodiment, the computer input device is a wheeled mouse as shown in FIGS. 1A and 1B, having a wheel button 106 flanked by left and right mouse buttons 104, 105. The inventive scrolling functionality is initiated by user actuation of a switch, which may be (but is not necessarily) provided as part of the computer input device, e.g., wheel button 106 of mouse 101. It is also possible to implement the present invention using a conventional computer keyboard with a built in wheel button in conjunction with a non-wheeled mouse.

In contrast to known "rate based" scrolling techniques as previously described, the present invention uses a "position based" (position-to-position mapping) technique, to compute a scroll amount based on a current relative position of the mouse. The inventive "position based" technique results in more intuitive control than the known "rate based" scrolling technique.

In a first embodiment of the invention, a page-positional scrolling (PPS) mode provides pixel-for-pixel mapping between an amount of movement of the mouse and the amount of scrolling within the active display region. When the user clicks the button associated with the scrolling function and drags the mouse, each one pixel of mouse motion in a predetermined direction, e.g., toward the user, results in a predetermined number of pixels of view scrolling. For example, there may be one pixel of view scrolling per one pixel of mouse movement. It is also possible to use a gain factor, such as two, resulting in two pixels of view scrolling for each one pixel of mouse movement. Other gain factors can also be used. View scrolling is scrolling where the document text, image, etc. appears to move upwards as the cursor is moved downwards. A reverse movement of the mouse (e.g., away from the user) results in a reverse scrolling of the document. Advantageously, PPS permits precision scrolling of short distances and can be carried out without a repositioning of the mouse onto a scroll bar or other display element.

In a second mode, document positional scrolling (DPS) provides quick scrolling over the entire range of a document. When the user clicks the scroll button and drags the mouse, the system responds essentially as if the user had clicked and dragged the thumb of a scroll bar, i.e., for every pixel of mouse movement the display is scrolled a distance equal to the ratio of document length to page length (or for a horizontal scroll, the ratio of document width to page width). As with use of the thumb of a scroll bar, DPS provides a means for quickly scrolling through a lengthy document. Scrolling is facilitated with DPS, however, because scrolling may be carried out without the need to reposition the mouse to a scroll bar or other scrolling functionality display element.

In a vertical scroll embodiment, the system need only process movement of the mouse along a single axis, e.g., an axis extending toward and away from the user. Movement of the mouse along an orthogonal axis may be ignored. For each pixel the mouse moves in the predetermined direction (corresponding to a vertical movement of the mouse cursor), the system scrolls the display as if a vertical scroll bar thumb has moved one pixel up or down, respectively. Optionally, the system may be set up to respond as if the user has clicked the thumb of a horizontal scroll bar. Still further, the system may be set up to respond as if the user has simultaneously clicked the thumbs of both a horizontal scroll bar and a vertical scroll bar. In such case, the system is set-up to scroll the display horizontally and/or vertically in response to mouse movement along orthogonal axes.

In a further embodiment of the invention, smoothed document positional scrolling (SDPS) is performed. SDPS combines page-positional scrolling and document-positional scrolling in a three-stage control scheme which allows greater flexibility and advantage in scrolling both short and long distances. When the user clicks (or, optionally, clicks and holds) the associated button and drags the mouse, SDPS will initially carry out PPS. As movement of the mouse continues in a predetermined direction, SDPS will smoothly transition between PPS and SDPS.

Figure 3A:
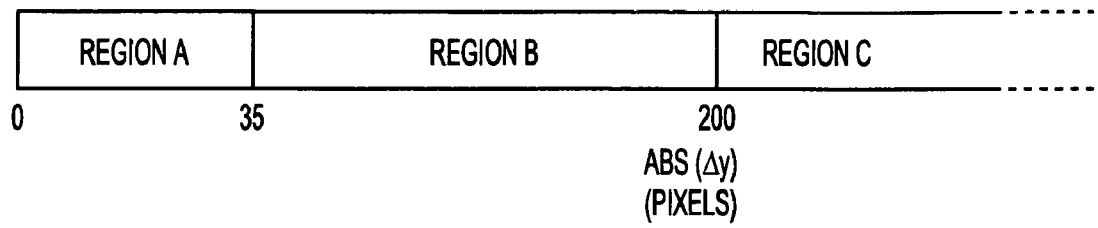
FIGS. 3A and 3B diagrammatically depict regions for use of different scrolling modes in accordance with the invention.

In SDPS, the system first records the position of the mouse as its home position. As the mouse is moved, the distance the mouse is offset from its home position is tracked and recorded. The absolute value of the mouse offset Abs ($\Delta y$) (preferably measured in pixels) is used to assign the mouse pointer to one of three logical Regions A, B, and C, as shown in FIG. 3A. While the mouse offset falls within region A, PPS is performed, giving the user smooth precision scrolling over short distances. Once the mouse offset progresses into Region B, the system enters a scrolling transition mode wherein a smoothing function is utilized to obtain a smooth transition from PPS to DPS. Once the mouse offset progresses to fall within Region C, DPS is performed, giving the user rapid motion with a high gain factor to quickly scroll longer distances.

Figure 3B:
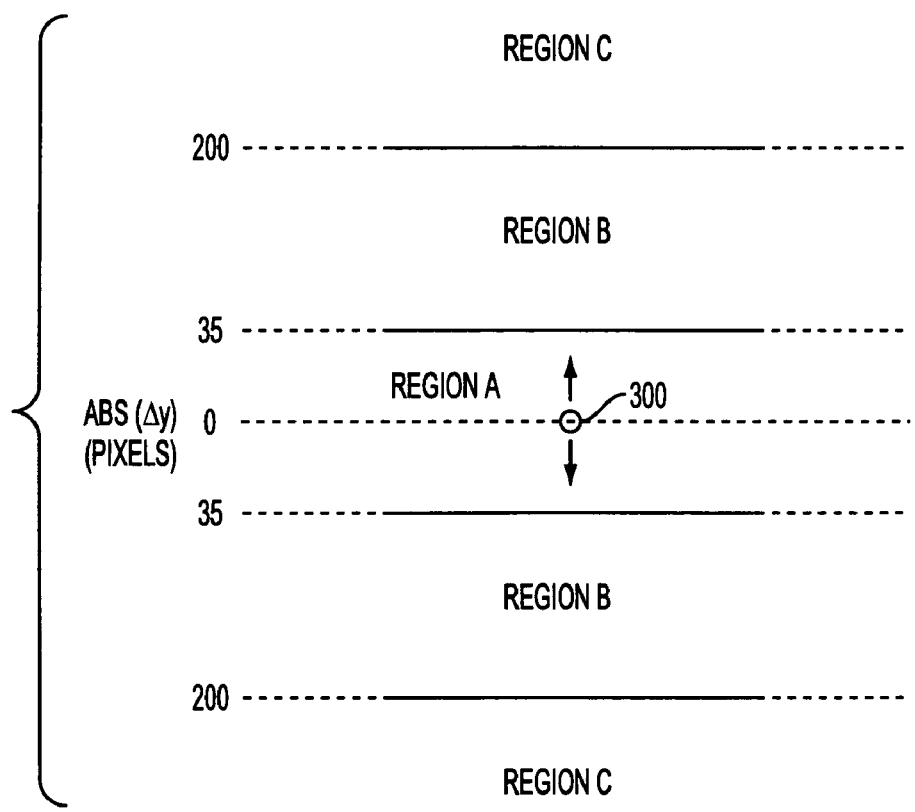

In the illustrated exemplary embodiment, offset Region A is defined as the pixel range $0<\text{Abs}(\Delta y)<=35$; offset Region B is defined as the pixel range $36<\text{Abs}(\Delta y)<=200$, and Region C is defined as $\text{Abs}(\Delta y)>200$. FIG. 3B provides a two dimensional (screen-like) representation of the Regions A, B, C, relative to the position of a mouse cursor 300 at initiation of SDPS. FIG. 3B illustrates a vertical scroll embodiment. In this embodiment, it is displacement of the mouse cursor in a vertical direction that initiates SDPS. It will be understood that the same principles can be applied equally to horizontal scrolling.

Figure 4:
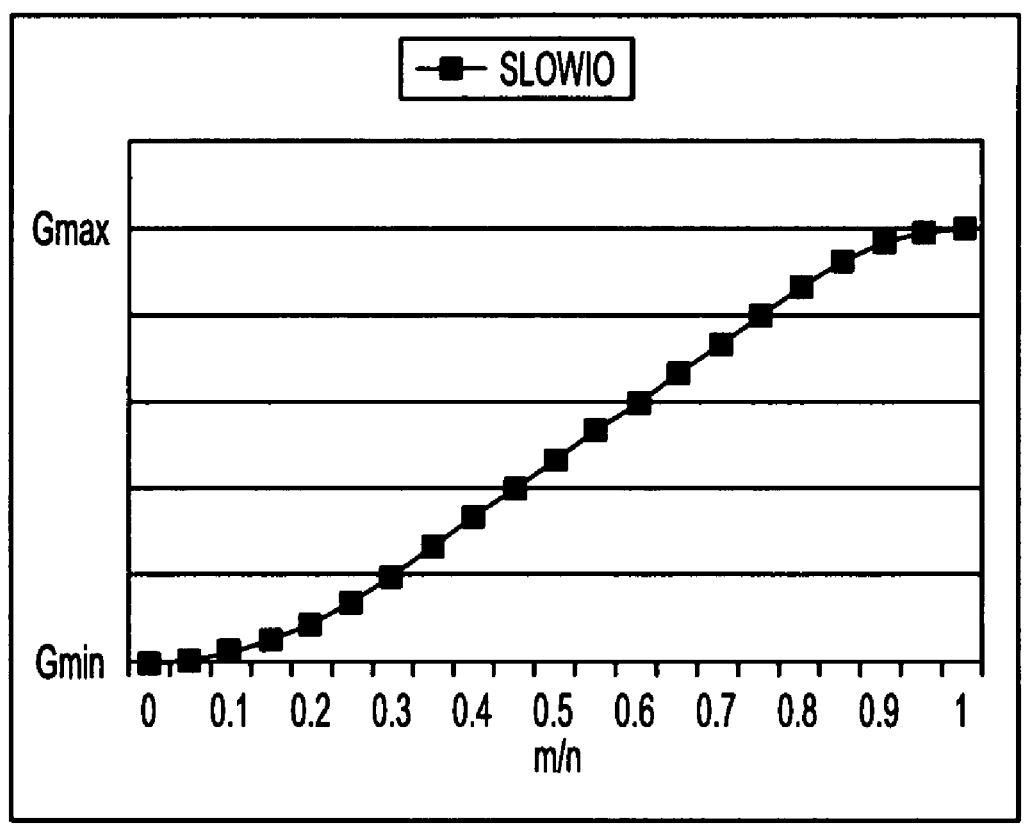
FIG. 4 is a graphical depiction of a transition curve of a "slow in-slow out" function applied in a transition scrolling mode in accordance with the present invention.

Preferably, a smoothing function as shown in FIG. 4 is used in Region B to transition between PPS and SDPS. This function, termed a "slow in-slow out" function (SlowIO), has previously been used in computer animation to transition between values as a function of time. In the present invention, the SlowIO function provides a transition between two gain factors as a function of cursor/mouse displacement: $G_{min}$ associated with region A, and $G_{max}$ associated with region C. These factors are preferably set as follows: $G_{min}=1$ (one pixel to one pixel); $G_{max}$=Document Length/Page Length (as used by the vertical scroll bar—Document Width/Page Width, as used by a horizontal scroll bar). The SlowIO function is used to blend between the two gain factors $G_{min}$ and $G_{max}$ based upon $Abs(\Delta y)$. The resultant gain factor $G_{actual}$ is:

$$G_{actual}=((G_{max}-G_{min})* \text{SlowInOut}(m, n))+G_{min} \quad \text{(Equation 1)}$$

where $m=Abs(\Delta y)-A'$ and $n=B'-A'$. $A'$ is the boundary between Regions A and B; $B'$ is the boundary between Regions B and C. The resultant amount of pixels to scroll $\Delta px$ is calculated based on $G_{actual}$:

$$\Delta px=G_{actual}*sgn(\Delta y)*\text{Log}(Abs(\Delta y)+1) \quad \text{(Equation 2)}$$

where sgn is the signum function, which provides a value of "1" if $\Delta y$ is positive, "−1" if $\Delta y$ is negative, and 0 if $\Delta y$ is 0; Log is the natural logarithm function.

The SlowIO function is essentially a sigmoid function used to transition between two gain factors, $G_{min}$ and $G_{max}$, in a smooth manner. A linear transition can also be used. As used in the present embodiment, SlowIO(m,n) is a three-stage function with function boundaries $C_1$ and $C_2$, defined as follows:

$$\text{If } (m/n)<C_1, \text{ then SlowIO}(m,n)=((C_2-1)/D)(m/n)^2 \quad \text{(Equation 3A)}$$

$$\text{If } (m/n)>C_2, \text{ then SlowIO}(m,n)=(1/D)((m/n)-2(m/n)+1)+1 \quad \text{(Equation 3B)}$$

$$\text{Otherwise, SlowIO}(m,n)=M(m/n)-(C_1 M/2) \quad \text{(Equation 3C)}$$

where, $D=C_1 (C_2^2-C_1C_2+C_1-1)$, and $M=2 (C_2-1)/D$. In a preferred embodiment, $C_1=0.3$ and $C_2=0.8$.

In a preferred embodiment, the home position of the mouse may be re-centered based on the speed (rate) at which the user moves the mouse (in a predetermined direction). When the user has moved the mouse far enough that the mouse offset would ordinarily enter Region B, but the user moves the mouse slower than a predetermined threshold speed for a predetermined amount of time, the system can be set-up such that the home position of the mouse is reset to the current mouse position, thus causing the system to remain in the PPS mode. This effectively re-centers the Regions A, B, and C so that the user remains in Region A. In a preferred embodiment, the threshold speed is set at 120 pixels per second (34 millimeters per second when a monitor with 0.28 mm dot pitch is used). Obviously, other threshold speeds may be selected.

If the user is moving the mouse faster than the threshold speed, the regions are not re-centered, and $\Delta px$ is calculated as above. The regions do not re-center while the user continues moving the mouse above the threshold speed (in the predetermined direction), and the scrolling amount (per unit of mouse movement) will, in Region B, gradually increase as the mouse offset increases, in accordance with the SlowIO function illustrated in FIG. 4.

If the user continues to move the mouse above the threshold speed and reaches the end of Region B, the scrolling will be performed with the maximum gain factor $G_{max}$. This maximum gain factor is multiplied by the mouse offset to determine the resulting scroll amount $\Delta px$, as described above. Within Region C, scrolling is performed as it is during document positional scrolling (DPS).

As previously stated, if the mouse offset enters Region B but the speed of the mouse movement falls below a threshold speed, the Regions A–C may be re-centered upon which the scrolling starts over again in Region A. There are several other events that may also be used to cause the regions to re-center in this manner—regardless of the present value of the mouse offset. For example, Regions A–C may be caused to re-center if the user changes (e.g., reverses) scrolling direction. That is, when $\Delta y$ changes sign, the home point of the regions may be reset to the current mouse position. Also, if at any time the user pauses mouse movement for a certain dwell time, the home position of the regions may be reset to the current mouse position. In this manner, whenever the user pauses to think, or changes his/her mind about which way to scroll due to overshooting or other factors, the system can compensate by reducing the scrolling gain factor. A dwell time of 150 ms has been found to work well. While various dwell times maybe chosen, taking into account user characteristics, in general a dwell time of at least 100 ms is preferred.

Display of the mouse cursor may be inhibited while the above scrolling operations are being performed. In a preferred embodiment of the invention, relative positioning of the mouse is determined without reference to an actual (visible) cursor on the display. As a result, the inventive scrolling technique can be carried out by moving the mouse beyond the point at which a visible cursor would have reached an edge of the active display region. By hiding the mouse cursor during the inventive scrolling operations, a misperception that scrolling control is limited by the confines of the active screen display can be avoided, and the user can confidently continue to scroll by moving the mouse without reference to the position of a visible mouse cursor. Instead of hiding the mouse cursor, an alternative cursor or icon could be displayed to inform the user that the mouse or other input device is being used in a scrolling mode. Multiple cursors could be used to reflect which of the scrolling modes (PPS, DPS, and SDPS) is presently being utilized.

The above scrolling modes may be provided as a user-selectable option, chosen by individual applications, or selected by the system based on the currently running application or observed user behavior. The inventive technique for smoothing scrolling input (SDPS) can also be applied to traditional scroll bars. In such a case, SDPS may be applied when the user clicks and drags the mouse cursor on the scroll bar thumb.

The invention may be implemented in firmware or software using the C programming language, or other languages such as C++, C#, Visual Basic, assembly language, and the like. The inventive techniques for scrolling are advantageously implemented on a system-wide level in the input device (e.g., mouse) driver. This eliminates the need for individual applications to support alternative scrolling modes. However, applications may implement their own custom variant of the inventive techniques to thus override or ignore the messages from the mouse driver.

Page positional scrolling can be easily implemented in the mouse driver (on a systemwide level) because it does not depend on document/application specific information. In such an implementation "page-up" and "page-down" commands can be sent to the application. Document positional scrolling (DPS) is dependent on document length and or width but nonetheless may be implemented in the input device driver without the need to keep track of each document's length or width. Rather, the driver can simply set the scroll bar thumb position based on the mouse (scrolling mode) input. That is, upon actuation of the DPS mode, the system can be set to react to mouse movement as it would have if the user had clicked and dragged the scroll bar thumb in a conventional manner. With this type of implementation the smallest change or quanta of movement is dependent on the scroll bar granularity, which is a function of document length or width in relation to scroll bar length or width, respectively. In one variation, to overcome this granularity, the mouse driver sends mouse wheel scrolling messages based on the horizontal and vertical movement of the mouse. Scroll messages have default granularity of three lines, and the granularity may be made even smaller depending on application or user preferences. For example, Microsoft's Internet Explorer can respond to scroll wheel messages with pixel-size granularity.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

The invention claimed is:

1. A scrolling control system for use with a data processing device having a display, comprising:
    a cursor control input device for providing, in response to user actuations of the device, control of a cursor position on said display;
    at least one user actuated switch; and
    control means responsive to a user actuation of said switch to enter a view scrolling mode wherein view scrolling of a document is controlled such that a discrete amount of scrolling is carried out for a discrete amount of user actuation of the cursor control input device, independent of a position of said cursor in relation to any scroll functionality elements appearing on said display,
    wherein said view scrolling mode comprises a document positional scrolling (DPS) mode wherein a predetermined amount of said discrete amount of user actuation results in said scroll amount corresponding to one of: a ratio of document length to page length; and a ratio of document width to page width.

2. A scrolling control system according to claim 1, wherein in said view scrolling mode a fixed linear relationship exists between a displacement represented by said discrete amount of user actuation and said discrete amount of scrolling.

3. A scrolling control system according to claim 1, said view scrolling mode comprising a page positional scrolling (PPS) mode wherein a one-to-one relationship exists between a displacement represented by said discrete amount of user actuation and said discrete amount of scrolling.

4. A scrolling control system according to claim 3, said view scrolling mode further comprising a transitional scrolling mode wherein said discrete scroll amount varies between the discrete scroll amount obtained in said PPS mode and the discrete scroll amount obtained in said DPS mode.

5. A scrolling control system according to claim 4, wherein the discrete scroll amount of the transitional scrolling mode varies smoothly between the discrete scroll amount obtained in said PPS mode and the discrete scroll amount obtained in said DPS mode, as a function of a displacement represented by said discrete amount of user actuation.

6. A scrolling control system according to claim 5, wherein the function is f(m,n) such that:

if $(m/n) < C_1$, then $f(m,n) = ((C_2-1)/D)(m/n)^2$;

if $(m/n) > C_2$, then $f(,n) = (1/D)((m/n) - 2(m/n) + 1) + 1$; and otherwise, $f(m,n) = M(m/n) = (C_1 M/2)$;

where $C_1$ and $C_2$ are internal function boundaries, D is a function of $C_1$ and $C_2$, M is a function of D and $C_2$, m is a displacement value, and n is a measure of a displacement region.

7. A scrolling control system according to claim 1, wherein said view scrolling mode is maintained by maintaining said user actuated switch in a closed condition, and is exited by releasing said switch.

8. A scrolling control system according to claim 1, wherein the control means inhibits display of said cursor during said view scrolling mode.

9. A scrolling control system according to claim 1, wherein said cursor control input device comprises a movable member, and said discrete amount of user actuation of the device comprises a movement of the moveable member.

10. A scrolling control system according to claim 9, wherein in said view scrolling mode a fixed linear relationship exists between a displacement of the movable member in a predetermined direction, and the discrete scroll amount.

11. A scrolling control system according to claim 9, said view scrolling mode comprising a page positional scrolling (PPS) mode wherein a one-to-one relationship exists between a displacement of the movable member in a predetermined direction, and the discrete scroll amount.

12. A scrolling control system according to claim 11, said view scrolling mode further comprising a transitional scrolling mode wherein said discrete scroll amount varies between the discrete scroll amount obtained in said PPS mode and the discrete scroll amount obtained in said DPS mode.

13. A scrolling control system according to claim 12, wherein the discrete scroll amount of the transitional scrolling mode varies smoothly between the discrete scroll amount obtained in said PPS mode and the discrete scroll amount obtained in said DPS mode, as a function of a displacement of the moveable member in a predetermined direction.

14. A scrolling control system according to claim 13, wherein the function is f(m,n) such that:

if $(m/n) < C_1$, then $f(m,n) = ((C_2-1)/D)(m/n)^2$;

if $(m/n) > C_2$, then $f(m,n) = (1/D)((m/n) - 2(m/n) + 1) + 1$; and otherwise, $f(m,n) = M(m/n) = (C_1 M/2)$;

where $C_1$ and $C_2$ are internal function boundaries, D is a function of $C_1$ and $C_2$, M is a function of D and $C_2$, m is a displacement value, and n is a measure of a displacement region.

15. A scrolling control system according to claim 12, wherein said control means records a home position of the moveable member when the system enters the view scrolling mode, monitors an offset of the moveable member from the home position while the system is in the view scrolling mode, implements the PPS mode when the offset of the moveable member is within a first range, implements the transitional scrolling mode when the offset of the moveable member is within a second range above said first range, and implement the DPS mode when the offset of the moveable member is within a third range above said second range.

16. A scrolling control system according to claim 15, wherein the control means resets the home position of the moveable member to a current position of the moveable member on the occurrence of at least one of the following events: the moveable member is moved at a rate slower than a predetermined threshold rate; the direction of movement of the moveable member changes; and the moveable member is not moved for a predetermined amount of time.

17. The system of claim 16, wherein the predetermined amount of time is approximately 150 milliseconds.

18. The system of claim 16, wherein the threshold rate is between 75 and 200 pixels per second.

19. The system of claim 18, wherein the threshold rate is approximately 120 pixels per second.

20. A scrolling system according to claim 9, wherein said user actuated switch is provided on said cursor control input device.

21. A scrolling control system according to claim 20, wherein said scrolling mode is maintained by maintaining said user actuated switch in a closed condition, and is exited by releasing said switch.

22. A scrolling control system according to claim 9, wherein the control means inhibits display of said cursor during said view scrolling mode.

23. A scrolling control system according to claim 9, wherein said cursor control input device comprises a computer mouse which itself constitutes said movable member.

24. A method for controlling scrolling of a document in a data processing system having a display, a user actuated switch and a cursor control input device that provides positional control of a cursor on said display in response to a user actuation of said input device, comprising:
  entering a view scrolling mode in response to a user actuation of said switch; and
  controlling view scrolling such that a discrete amount of scrolling is carried out for a discrete amount of user actuation of the cursor control input device, said control being independent of a position of said cursor in relation to any scroll functionality elements appearing on said display,
  wherein said view scrolling mode comprises a document positional scrolling (DPS) mode wherein a predetermined amount of said discrete amount of user actuation results in said discrete scroll amount corresponding to one of: a ratio of document length to page length and a ratio of document width to page width.

25. A method according to claim 24, wherein in said view scrolling mode a fixed linear relationship exists between a displacement represented by said discrete amount of user actuation and said discrete amount of scrolling.

26. A method according to claim 28, said view scrolling mode comprising a page positional scrolling (PPS) mode wherein a one-to-one relationship exists between a displacement represented by said discrete amount of user actuation and said discrete amount of scrolling.

27. A method according to claim 26, said view scrolling mode further comprising a transitional scrolling mode wherein said discrete scroll amount varies between the discrete scroll amount obtained in said PPS mode and the discrete scroll amount obtained in said DPS mode.

28. A method according to claim 27, wherein the discrete scroll amount of the transitional scrolling mode varies smoothly between the discrete scroll amount obtained in said PPS mode and the discrete scroll amount obtained in said DPS mode, as a function of a displacement represented by said discrete amount of user actuation.

29. A method according to claim 28, wherein the function is f(m,n) such that:

If $(m/n) < C_1$, then $f(m,n) = ((C_2-1)/D)(m/m)^2$;

If $(m/n) > C_2$, then $f(m,n) = (1/D)((m/n)-2(m/n)+1) \times 1$; and

Otherwise, $f(m,n) = M(m/n) - (C_1 M/2)$;

where $C_1$ and $C_2$ are internal function boundaries, D is a function of $C_1$ and $C_2$, M is a function of D and $C_2$, m is a displacement value, and n is a measure of a displacement region.

30. A method according to claim 24, further comprising:
  maintaining the view scrolling mode while said user actuated switch is maintained in a closed condition; and
  exiting the view scrolling mode when the switch is released.

31. A method according to claim 24, further comprising:
  inhibiting display of said cursor during said view scrolling mode.

32. A method according to claim 24, wherein said cursor control input device comprises a movable member, and said user actuation of the cursor control input device comprises movement of the moveable member.

33. A method according to claim 32, said view scrolling mode further comprising a transitional scrolling mode wherein said discrete scroll amount varies between the discrete scroll amount obtained in said PPS mode and the discrete scroll amount obtained in said DPS mode.

34. A method according to claim 33, wherein the discrete scroll amount varies smoothly between the discrete scroll amount obtained in said PPS mode and the discrete scroll amount obtained in said DPS mode, as a function of said displacement.

35. A method according to claim 34, wherein the function is f(m,n) such that:

if $(m/n) < C_1$, then $f(m,n) = ((C_2-1)/D)(m/n)^2$;

if $(m/n) > C_2$, then $f(m,n) = (1/D)((m/n)-2(m/n)+1)+1$; and otherwise, $f(m,n) = M(m/n) - (C_1 M/2)$;

where $C_1$ and $C_2$ are internal function boundaries, D is a function of $C_1$ and $C_2$, M is a function of D and $C_2$, m is a displacement value, and n is a region length.

36. A method according to claim 33, further comprising:
  recording a home position of the moveable member when the system enters the view scrolling mode;
  monitoring an offset of the moveable member from the home position while the system is in the view scrolling mode;
  implementing the PPS mode when the offset of the moveable member is within a first range;
  implementing the transitional scrolling mode when the offset of the moveable member is within a second range above said first range; and
  implementing the DPS mode when the offset of the moveable member is within a third range above said second range.

37. A method according to claim 36, further comprising:
  resetting the home position of the moveable member to a current position of the moveable member on the occurrence of at least one of the following events: the moveable member is moved at a rate slower than a predetermined threshold rate; the direction of movement of the moveable member changes; and the moveable member is not moved for a predetermined amount of time.

38. A method according to claim 37, wherein the predetermined amount of time is approximately 150 milliseconds.

39. A method according to claim 37, wherein the threshold rate is between 75 and 200 pixels per second.

40. A method according to claim 39, wherein the threshold rate is approximately 120 pixels per second.

41. A method according to claim 32, wherein said user actuated switch is provided on said cursor control input device.

42. A method according to claim 41, further comprising:
   maintaining said view scrolling mode by maintaining said user actuated switch in a closed condition; and
   exiting said view scrolling mode by releasing said switch.

43. A method according to claim 32, further comprising: inhibiting display of said cursor during said view scrolling mode.

44. A method according to claim 32, wherein said cursor control input device comprises a computer mouse which itself constitutes said movable member.

45. A method according to claim 32, wherein in said view scrolling mode a fixed linear relationship exists between a displacement of the movable member in a predetermined direction, and the discrete scroll amount.

46. A method for controlling scrolling of a document in a data processing system having a display, a user actuated switch and a cursor control input device that provides positional control of a cursor on said display in response to a user actuation of said input device, comprising:
   entering a view scrolling mode in response to a user actuation of said switch; and
   controlling view scrolling such that a discrete amount of scrolling is carried out for a discrete amount of user actuation of the cursor control input device, said control being independent of a position of said cursor in relation to any scroll functionality elements appearing on said display,
   wherein said cursor control input device comprises a movable member, and said user actuation of the cursor control input device comprises movement of the moveable member, and
   wherein said view scrolling mode comprises a page positional scrolling (PPS) mode wherein a one-to-one relationship exists between a displacement of the movable member in a predetermined direction, and the discrete scroll amount.

47. A scrolling control system for use with a data processing device having a display, comprising:
   an input device for providing, in response to user actuations of the device, control of a cursor position on said display;
   at least one user actuated switch; and
   control means responsive to a user actuation of said switch to enter a scrolling mode wherein scrolling of a document is controlled such that a scroll amount is based upon a position value determined by a user actuation of the input device;
   wherein said scrolling mode comprises:
      a page positional scrolling (PPS) mode wherein a one-to-one relationship exists between a displacement represented by said position value and a scroll amount;
      a document positional scrolling (DPS) mode wherein a unit amount of displacement represented by said position value results in a scroll amount corresponding to one of a ratio of document length to page length and a ratio of document width to page width; and
      a transitional scrolling mode providing a scroll amount that varies between the scroll amount obtained in said PPS mode and the scroll amount obtained in said DPS mode.

48. A scrolling control system according to claim 47, wherein during the transitional scrolling mode the scroll amount varies smoothly between the scroll amount obtained in said PPS mode and the scroll amount obtained in said DPS mode, as a function of said displacement represented by said position value.

49. A scrolling control system according to claim 48, wherein the function is f(m,n) such that:

if $(m/n) < C_1$, then $f(m,n) = ((C_2-1)/D) = (m/n)^2$;

if $(m/n) > C_2$, then $f(m,n) = (1/D)((m/n)-2(m/n)+1)+1$; and otherwise, $f(m,n) = M(m/n) - (C_1 M/2)$;

wherein $C_1$ and $C_2$ are internal function boundaries, D is a function of $C_1$ and $C_2$, M is a function of D and $C_2$, m is a displacement value, and n is a measure of a displacement region.

50. A scrolling control system according to claim 47, wherein said control means is operative on a system-wide level.

51. A method for controlling scrolling of a document in a data processing system having a display, a user actuated switch and an input device that provides positional control of a cursor on said display in response to a user actuation of said input device, comprising the steps of:
   entering a scrolling mode in response to a user actuation of said switch; and
   controlling scrolling such that a scroll amount is based on a position value determined by the user actuation of the input device;
   wherein said scrolling mode comprises:
      a page positional scrolling (PPS) mode wherein a one-to-one relationship exists between a displacement represented by said position value and a scroll amount;
      a document positional scrolling (DPS) mode wherein a unit amount of displacement represented by said position value results in a scroll amount corresponding to one of a ratio of document length to page length and a ratio of document width to page width; and
      a transitional scrolling mode providing a scroll amount that varies between the scroll amount obtained in said PPS mode and the scroll amount obtained in said DPS mode.

52. A method according to claim 51, wherein in the transitional scrolling mode the scroll amount varies smoothly between the scroll amount obtained in said PPS mode and the scroll amount obtained in said DPS mode, as a function of said displacement represented by said position value.

53. A method according to claim 52, wherein the function is f(m,n) such that:

if $(m/n) < C_1$, then $f(m,n) = ((C_2-1)/D)(m/n)^2$;

if $(m/n) > C_2$, then $f(m,n) = (1/D)((m/n)-2(m/n)+1)+1$; and otherwise, $f(m,n) = M(m/n) - (C_1 M/2)$;

wherein $C_1$ and $C_2$ are internal function boundaries, D is a function of $C_1$ and $C_2$, M is a function of D and $C_2$, m is a displacement value, and n is a measure of a displacement region.

54. A method according to claim 51, wherein the controlling scrolling step is carried out on a system-wide level.

55. A scrolling control system for use with a data processing device having a display, comprising:

a cursor control input device for providing, in response to user actuations of the device, control of a cursor position on said display;

at least one user actuated switch; and control means responsive to a user actuation of said switch to enter a scrolling mode wherein scrolling of a document is controlled such that a discrete amount of scrolling is carried out for a discrete amount of user actuation of the cursor control input device, independent of a position of said cursor in relation, to any scroll functionality elements appearing on said display;

wherein said scrolling mode comprises a document positional scrolling (DPS) mode wherein a predetermined amount of displacement represented by said discrete amount of user actuation results in a discrete scroll amount corresponding to one of: a ratio of document length to page length; and a ratio of document width to page width.

56. A method for controlling scrolling of a document in a data processing system having a display, a user actuated switch and a cursor control input device that provides positional control of a cursor on said display in response to a user actuation of said cursor control input device, comprising:

entering a scrolling mode in response to a user actuation of said switch; and controlling scrolling such that a discrete amount of scrolling is carried out for a discrete amount of user actuation of the cursor control input device, said control being independent of a position of said cursor in relajion to any scroll functionality elements appearing on said display;

wherein said scrolling mode comprising a document positional scrolling (DPS) mode wherein a predetermined amount of said discrete amount of user actuation results in a discrete scroll amount corresponding to one of: a ratio of document length to page length; and a ratio of document width to page width.

* * * * *

UNITED STATES PATENT AND TRADEMARK OFFICE
CERTIFICATE OF CORRECTION

PATENT NO.         : 7,071,919 B2                                     Page 1 of 1
APPLICATION NO.    : 09/791899
DATED              : July 4, 2006
INVENTOR(S)        : Hinckley et al.

It is certified that error appears in the above-identified patent and that said Letters Patent is hereby corrected as shown below:

Title Page, On page 2, Item (56), under "Other Publications", in column 1, line 9, delete "Labarotory" and insert -- Laboratory --, therefor.

In column 8, line 9, delete "maybe" and insert -- may be --, therefor.

In column 9, line 57, in Claim 6, delete "f(,n)=(1/D)((m/n)–2(m/n)+1)+1;" and insert -- f(m,n)=(1/D)((m/n)–2(m/n)+1)+1; --, therefor.

In column 9, line 61, in Claim 6, delete "f(m,n)=M(m/n)=($C_1$M/2);" and insert -- f(m,n)=M(m/n)–($C_1$M/2); --, therefor.

In column 10, line 30, in Claim 13, delete "predetennined" and insert -- predetermined --, therefor.

In column 10, line 39, in Claim 14, delete "f(m,n)=M(m/n)=($C_1$M/2);" and insert -- f(m,n)=M(m/n)–($C_1$M/2); --, therefor.

In column 11, line 33, in Claim 24, after "page" delete "length" and insert -- length; --, therefor.

In column 11, line 40, in Claim 26, delete "claim 28" and insert -- claim 24 --, therefor.

In column 11, line 58, in Claim 29, delete "f(m,n)=(($C_2$–1)/D)(m/m)$^2$;" and insert -- f(m,n)=(($C_2$–1)/D)(m/n)$^2$; --, therefor.

In column 11, line 60, in Claim 29, delete "f(m,n)=(1/D)((m/n)–2(m/n)+1)×1;" and insert -- f(m,n)=(1/D)((m/n)–2(m/n)+1)+1; --, therefor.

In column 15, line 10, in Claim 55, delete "relation," and insert -- relation --, therefor.

In column 16, line 10, in Claim 56, delete "relajion" and insert -- relation --, therefor.

Signed and Sealed this

Thirteenth Day of April, 2010

David J. Kappos
*Director of the United States Patent and Trademark Office*